United States Patent
West

(10) Patent No.: US 9,931,984 B2
(45) Date of Patent: Apr. 3, 2018

(54) VEHICLE REAR SEAT VANITY MIRROR ASSEMBLY

(75) Inventor: Mark West, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 985 days.

(21) Appl. No.: 13/464,702

(22) Filed: May 4, 2012

(65) Prior Publication Data

US 2013/0292959 A1  Nov. 7, 2013

(51) Int. Cl.
| | |
|---|---|
| *B60R 1/04* | (2006.01) |
| *B60R 11/02* | (2006.01) |
| *B60R 1/12* | (2006.01) |
| *B60R 11/00* | (2006.01) |

(52) U.S. Cl.
CPC ............ *B60R 1/04* (2013.01); *B60R 11/0235* (2013.01); *B60R 2001/1215* (2013.01); *B60R 2001/1238* (2013.01); *B60R 2011/0028* (2013.01)

(58) Field of Classification Search
USPC ............... 296/1.11, 97.5; 362/135, 144, 492; 359/841
See application file for complete search history.

(56) References Cited

U.S. PATENT DOCUMENTS

| | | | | |
|---|---|---|---|---|
| 5,174,644 | A | * 12/1992 | Hermansson et al. | ........ 362/492 |
| 5,940,120 | A | * 8/1999 | Frankhouse et al. | ........... 348/61 |
| 6,409,242 | B1 | 6/2002 | Chang | |

FOREIGN PATENT DOCUMENTS

| | | |
|---|---|---|
| DE | 19540640 A1 | 5/1997 |
| EP | 0462087 A1 | 12/1991 |
| JP | 2006117207 A | 5/2006 |
| WO | 2008086109 A2 | 7/2008 |

OTHER PUBLICATIONS

State Intellectual Property Office of the People's Republic of China, Office Action in Chinese Patent Application No. 201310240220.7, dated Mar. 30, 2015.

* cited by examiner

*Primary Examiner* — Jason S Daniels
(74) *Attorney, Agent, or Firm* — Lorenz & Kopf, LLP

(57) ABSTRACT

Vanity mirror assemblies are provided for vehicles having a body, front seats, a rear portion behind the front seats, and a vanity mirror assembly. The vanity mirror assembly includes a housing, a light source, a display screen, and a two-way mirror. The light source is disposed in the rear portion of the vehicle. The display screen is disposed within the housing between the front seats and the light source. The two-way mirror is disposed within the housing between the light source and the display screen. The display screen is movable with the two-way mirror.

20 Claims, 5 Drawing Sheets

VEHICLE REAR SEAT VANITY MIRROR ASSEMBLY

TECHNICAL FIELD

The present disclosure generally relates to the field of vehicles and, more specifically, to a vanity mirror with display capability for rear occupants of a vehicle.

BACKGROUND

Many vehicles include vanity mirrors. Typically, the vanity mirrors are viewable from front seats of the vehicle. However, in certain embodiments, it may be desirable to provide vanity mirrors in different portions of the vehicle with additional functionality.

Accordingly, it is desirable to provide improved vanity mirror assemblies for vehicles. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a vanity mirror assembly is provided for a vehicle having front seats and a rear portion behind the front seats. The vanity mirror assembly comprises a light source, a display screen, and a two-way mirror. The light source is disposed in the rear portion. The display screen is disposed between the front seats and the light source. The two-way mirror is disposed between the light source and the display screen.

In accordance with another exemplary embodiment, a vanity mirror assembly is provided for a vehicle having front seats and a rear portion behind the front seats. The vanity mirror assembly comprises a housing, a mirror, and a display screen. The mirror is disposed within the housing in the rear portion of the vehicle, and is partially reflective and partially transparent. The display screen is disposed within the housing between the front seats and the mirror.

In accordance with a further exemplary embodiment, a vehicle is provided. The vehicle comprises a body, front seats, a rear portion behind the front seats, and a vanity mirror assembly. The vanity mirror assembly comprises a housing, a two-way mirror, and a display screen. The two-way mirror is disposed within the housing in the rear portion of the vehicle. The display screen is disposed within the housing between the front seats and the two-way mirror, and is movable with the two-way mirror.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
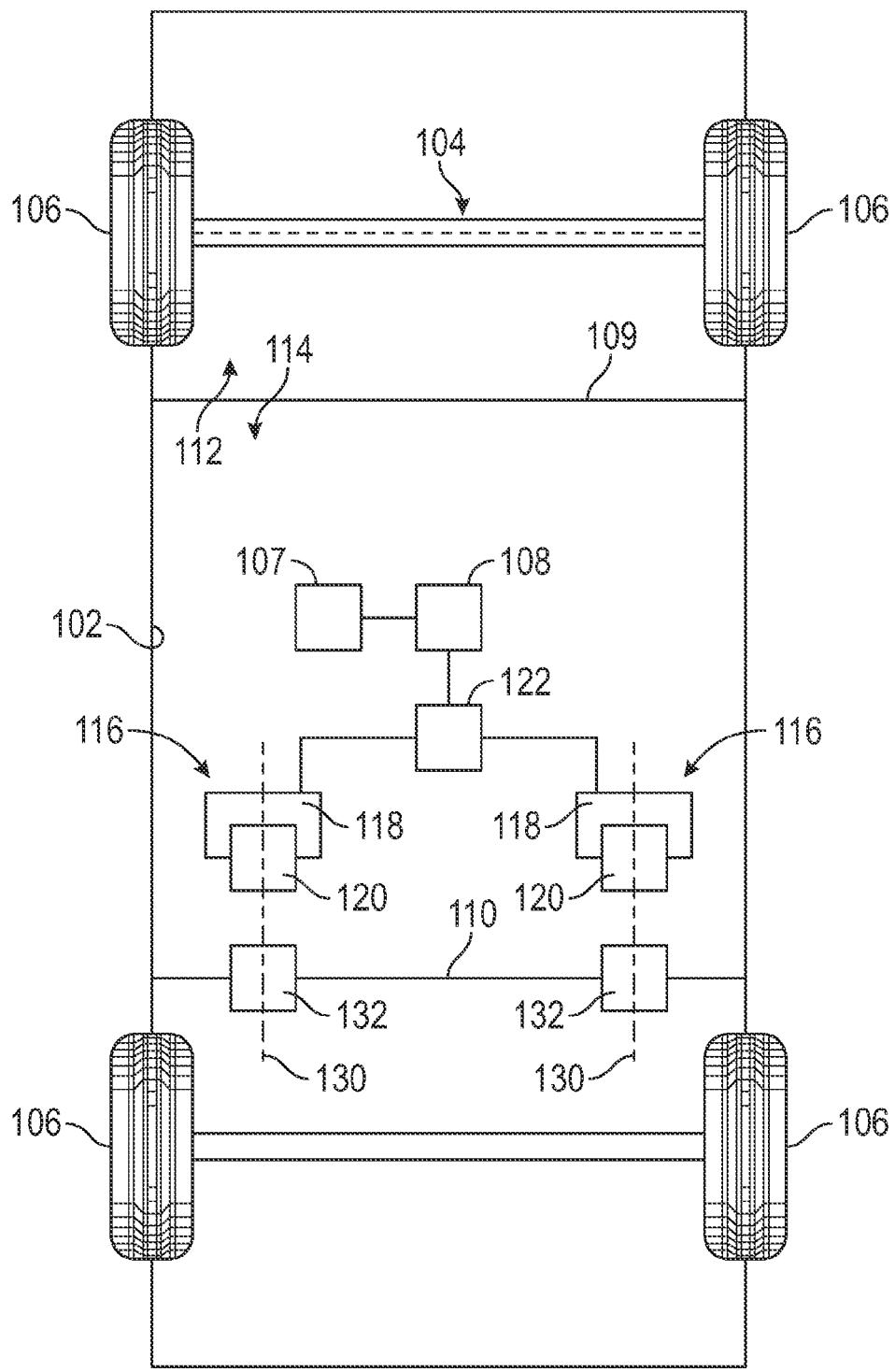
FIG. 1 is a functional block diagram of a vehicle that includes a rear vanity mirror assembly featuring a vanity mirror and a display screen viewable by occupants in a rear portion of the vehicle behind the front seats of the vehicle, in accordance with an exemplary embodiment.

FIG. 1 illustrates a vehicle 100, according to an exemplary embodiment. As described in greater detail further below, the vehicle 100 includes rear vanity mirror assemblies 116 that are usable by rear occupants of the vehicle 100 as both a vanity mirror and a display screen. The vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments.

The vehicle 100 includes a body 102 that is arranged on a chassis 104. The body 102 substantially encloses other components of the vehicle 100. The body 102 and the chassis 104 may jointly form a frame. The vehicle 100 also includes a plurality of wheels 106. The wheels 106 are each rotationally coupled to the chassis 104 near a respective corner of the body 102 to facilitate movement of the vehicle 100. In a preferred embodiment, the vehicle 100 includes four wheels, although this may vary in other embodiments (for example for trucks and certain other vehicles).

The drive system 107 is mounted on the chassis 104, and drives the wheels 106. The drive system 107 preferably comprises a propulsion system that is coupled to a controller 108. In certain exemplary embodiments, the drive system 107 comprises an internal combustion engine and/or an electric motor/generator, coupled with a transmission thereof. In certain embodiments, the drive system 107 may vary, and/or two or more drive systems 107 may be used. By way of example, the vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle 100 includes a front row 109 of passenger seating (also referred to as front seats) and a rear row 110 of passenger seating (also referred to as rear seats) within an interior of the vehicle 100 enclosed by the body 102. In the depicted embodiment, there is one rear row 110 of passenger seating. However, in certain other embodiments there may be two or more rear rows 110 of passenger seating.

With further reference to FIG. 1, a front portion 112 of the vehicle 100 is referred to herein as the region inside the body 102 of the vehicle 100 that is (i) in front of the front row 109 and that is (ii) visible to occupants of the vehicle that are seated in the front row 109 while facing forward. A rear portion 114 of the vehicle 100 is referred to herein as region inside the body 102 of the vehicle 100 that is (i) behind the front row 109 and that is (ii) visible to occupants of the rear row 110 while facing forward and (iii) not visible to occupants of the vehicle that are seated in the front row 109 while facing forward. Alternatively stated, the front row 109 of seating faces the front portion 112 but not the rear portion 114 of the vehicle 100. The one or more rear vanity mirror assemblies 116 are disposed in the rear portion 114 of the vehicle 100.

In the depicted embodiment, the vehicle 100 includes two rear vanity mirror assemblies 116. Specifically, a rear vanity mirror assembly 116 is provided for both of the rear side passengers 132 of the rear row 110. In certain embodiments, a rear vanity mirror assembly 116 may also be provided for a center passenger of the rear row 110 (not depicted). In addition, in certain embodiments, occupants of any additional rear rows 110 may also be provided similar rear vanity mirror assemblies 116. The rear vanity mirror assemblies are typically positioned so that a centerline of the mirror in the cross car direction is aligned to the centerline 130 of the rear occupants. In certain embodiments, a single rear vanity mirror assembly 116 may be utilized.

The rear vanity mirror assembly 116 includes a housing 118 and a display 120. The display 120 is disposed at least partially within the housing 118 within the rear portion 114 of the vehicle 100. As described in further detail further below in connection with FIGS. 2-5, the display 120 can be used by rear occupants of the vehicle 100 as a vanity mirror or as a display screen, depending upon the preferences of the rear occupants. As referenced herein, rear occupants are defined as vehicle occupants that are seated in the rear row 110 of the vehicle 100.

Also as depicted in FIG. 1, the rear vanity mirror assembly 116 (preferably, the display 120 thereof) is coupled to one or more content sources 122. The content sources 122 may include one or more digital and/or video sources such as a digital video disk or digital versatile disk (DVD) player, a navigation system, a gaming system, a digital media device (for example, an MP3 player), a computer or computer component, a digital speaker phone, and/or one or more other devices configured to provide content (such as video content) for the display 120. In certain embodiments, the content sources 122 and/or the rear vanity mirror assembly 116 may be controlled via a controller, such as the above-referenced controller 108. In addition, the content sources 122 may include vehicle information, for example that may be obtained via the controller 108 and/or the driver system 107, for display for vehicle occupants.

Figure 2:
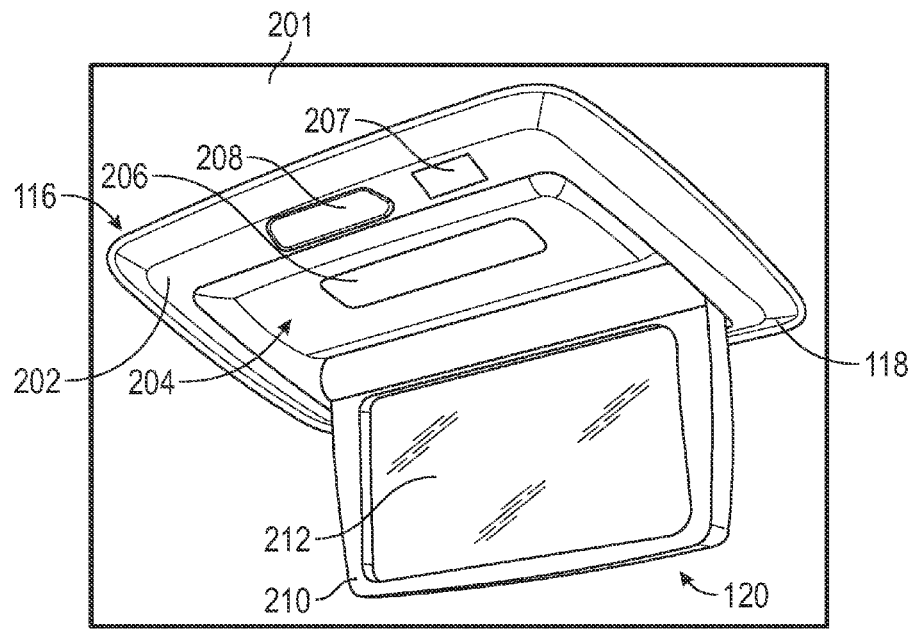
FIG. 2 is a schematic diagram of the rear vanity mirror assembly of FIG. 1, shown from a bottom view as mounted within a headliner of the vehicle of FIG. 1, in accordance with an exemplary embodiment.

Turning now to FIG. 2, a schematic diagram is provided of the rear vanity mirror assembly 116 of FIG. 1, in accordance with an exemplary embodiment. Specifically, in FIG. 2, the rear vanity mirror assembly 116 is shown from a bottom view as mounted within a headliner 201 of the vehicle 100 (proximate a ceiling of the interior of the vehicle 100). Specifically, a base 202 of the housing 118 of FIG. 1 is mounted within the headliner 201. The base 202 defines a cavity 204 disposed against the headliner 201. A light source 206 is disposed within the cavity 204 against the headliner 201 in the rear portion 114 of the vehicle 100 of FIG. 1. The light source 206 is disposed rearward of the display 120, between the display 120 and the rear occupants of the vehicle (or, alternatively stated, such that the display 120 is disposed between the light source 206 and the front seats 109 of the vehicle 100) when the display 120 is deployed in the open position. Accordingly, light emitted from the light source 206 contacts the display 120 from a rear and downward direction of the vehicle (for example, from the rear portion 114 of FIG. 1). The light source 206 is turned on and off via a switch 207 that is disposed within the housing 118, and that is preferably disposed within or against the base 202 thereof. In various embodiments, the light source 206 may comprise a lamp, or any one of a number of different types of light sources provided light in the visible spectrum. Specifically, in certain examples, the light source 206 may comprise an incandescent light bulb, or a Light Emitting Diode (L.E.D.) with a directional/decorative lens. In certain other embodiments, the light source 206 may comprise a light pipe, or a molded piece of plastic that contains optics to funnel light (typically provided by an LED) to a specific area separate from the light source.

The display 120 is movable between a closed position and an open position. When in the closed position (not depicted), the display 120 is disposed within the cavity 204 approximately flush against the headliner 201. When in the open position (depicted in FIG. 2), the display 120 extends downward from the base 202 and the headliner 201. As shown in FIG. 2, a release (e.g., button) 208 (preferably disposed within the base 202) is used by an occupant of the vehicle 100 to move the display 120 from the closed position to the open position, for example around a rotation point via a pre-loaded spring (not depicted) in the base 202. In certain embodiments, the rotating mechanism also includes a damper (not depicted) to help lower the display in a controlled manner.

Also as shown in FIG. 2, the display 120 includes a display housing 210 and a viewable region 212. The viewable region 212 is surrounded by the display housing 210, and rotates with the display housing between the closed position and the open position. The viewable region 212 is used by occupants as a vanity mirror or alternatively as a display screen, depending upon whether the light source 206 is powered on, as described in greater detail further below.

Figure 3:
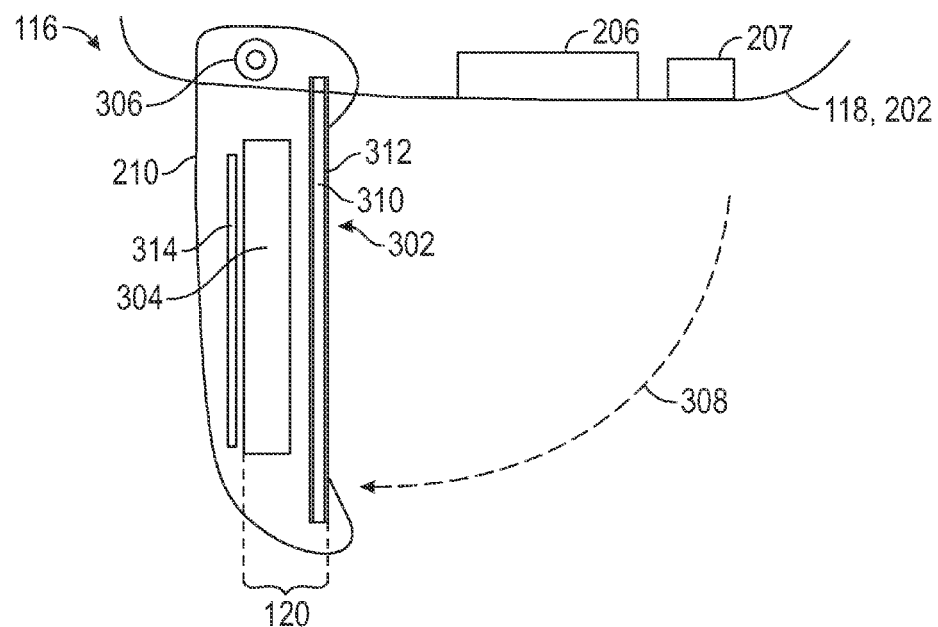
FIG. 3 is a schematic diagram of the rear vanity mirror assembly of FIGS. 1 and 2, in accordance with an exemplary embodiment.

FIG. 3 is a schematic diagram of the rear vanity mirror assembly 116 of FIGS. 1 and 2, in accordance with an exemplary embodiment. The display includes a two-way mirror 302 and a display screen 304. The display screen 304 is disposed on a front side of the two-way mirror 302, between the front seats 109 of the vehicle 100 and the two-way mirror 302, and between the front seats 109 of the vehicle 100 and the light source 206. Alternatively stated, the two-way mirror 302 is disposed on a rear side of the display screen 304, between the display screen 304 and the light source 206, and between the display screen 304 and the rear occupants of the vehicle 100 (i.e., between the display screen 304 and the rear row 110 of seating).

As depicted in FIG. 3, the two-way mirror 302 and the display screen 304 are disposed adjacent to one another. The two-way mirror 302 and the display screen 304 are movable, and rotatable, from the housing 118 (and specifically from the base 202) together between the open and closed positions described above via a hinge 306 and a pre-loaded spring (not depicted) disposed in the base 202, to thereby generate a flip motion 308 for the display 120 downward toward the open position and upward toward the closed position.

The two-way mirror 302 is a mirror that is partially reflective and partially transparent. Specifically, when one side of the two-way mirror 302 is relatively brightly lit and the other side of the two-way mirror 302 is relatively dark, viewing through the two-way mirror 302 is possible from the relatively dark side of the two-way mirror 302 but not from the relatively bright side of the two-way mirror 302. The two-way mirror 302 preferably comprises a transflective mirror (namely, having both transmissive and reflective qualities). The two-way mirror 302 faces the rear portion 114 of the vehicle 100 (and specifically faces the rear row 110 of seating), such that occupants in the rear row 110 may use the two-way mirror 302 as a vanity mirror while the light source 206 is powered on.

The two-way mirror 302 preferably comprises a core material 310 and a coating 312. In one exemplary embodiment, the two-way mirror 302 is made of glass as the core material 310, with a metal coating 312 (preferably, an aluminum coating) on both sides of the glass. In another exemplary embodiment, the two-way mirror 302 is made of an acrylic material as the core material 310, with a metal coating 312 (preferably, an aluminum coating) on both sides of the glass. In certain other embodiments, the two-way mirror 302 comprises a plastic, chromium, aluminum or similar metal alloy as the core material 301, with a metal coating 312 (preferably, an aluminum coating) on both sides of the glass.

The display screen 304 provides content for viewing by occupants seated in the rear row 110 of the vehicle 100 while such occupants are facing forward. The display screen 304 is thus visible from, and faces, the rear portion 114 of the vehicle 100. The display screen 304 preferably comprises a video screen. In one exemplary embodiment the display screen 304 comprises a liquid crystal display (LCD) screen. In another exemplary embodiment, the display screen 304 comprises a light emitting diode (LED) screen. In yet other exemplary embodiments, the display screen 304 may comprise one of various other types of screens.

The display screen 304 includes or is coupled to electronic apparatus 314. The electronic apparatus 314 couples the display screen 304 to the one or more content sources 122 of FIG. 1, such as a DVD player, a navigation system, a gaming system, a digital media device (for example, an MP3 player), a computer or computer component, a digital speaker phone, and/or one or more other devices configured to provide video and/or other content for the display 120, and specifically for the display screen 304 thereof. In one embodiment, the electronic apparatus 314 includes a connector (not shown) for connecting the display screen 304 to the content source 122, for example via a wired connection within the vehicle 100. In other embodiments, the electronic apparatus 314 includes a transceiver supporting wireless communication. In still other embodiments, the electronic apparatus 314 is physically part of, or built into, the display screen 304. In another embodiment, the electronic apparatus 314 is adjacent to the display screen 304.

In addition, in one preferred embodiment, the display screen 304 is powered on and off by the above-referenced switch 207, which may be engaged by one of the rear occupants. Preferably, when the display 120 is in the open position of FIGS. 2 and 3, the switch 207 may be engaged to selectively power on the light source 206 or the display screen 304, so that one of the light source 206 or the display screen 304 is powered on while the other is powered off. Specifically, if the switch 207 is in a first position while the display 120 is in the open position of FIGS. 2 and 3, the light source 206 is powered on and the display screen 304 is powered off. Conversely, if the switch 207 is in a second position while the display 120 is in the open position of FIGS. 2 and 3, the light source 206 is powered off and the display screen 304 is powered on. If the display 120 is instead in the closed position (i.e., flush against the headliner 201 of FIG. 2), the light source 206 and the display screen 304 may both be automatically powered off, in one embodiment.

Figure 4:
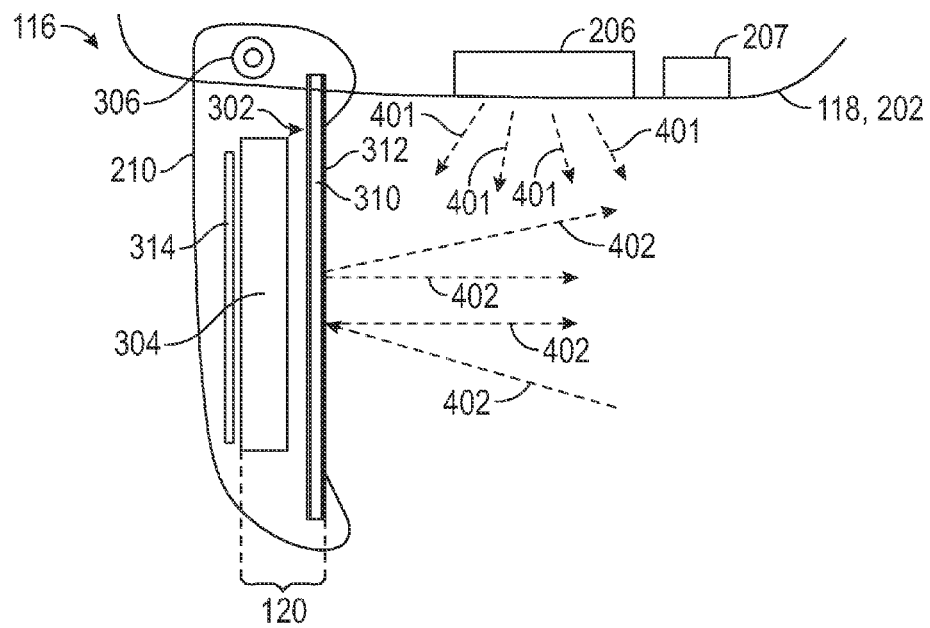
FIG. 4 is a schematic diagram of the rear vanity mirror assembly of FIGS. 1 and 2, shown with an associated light source powered on and the display screen powered off, so that an occupant in the rear portion of the vehicle behind the front seats can use the rear vanity mirror assembly as a vanity mirror, in accordance with an exemplary embodiment.

FIG. 4 is a schematic diagram of the rear vanity mirror assembly 116 of FIGS. 1 and 2, shown with the light source 206 powered on and the display screen 304 powered off (corresponding to when the switch 207 is in the first position described above), in accordance with an exemplary embodiment. When the light source 206 is on, as in FIG. 4, light rays 401 are emitted from the light source 206 (preferably, aimed at least partially toward the faces of the occupants 132 of the rear row 110). The facial illumination is then viewable view incident and reflective rays 402 while using the mirror 302. As such, and because the rear side of the two-way mirror 302 (i.e., the side facing toward the rear occupants) is relatively bright (as compared with the front side of the two-way mirror 302), the display 120 functions as a vanity mirror for the rear occupants while the light source 206 is on and the display screen 304 is off.

Figure 5:
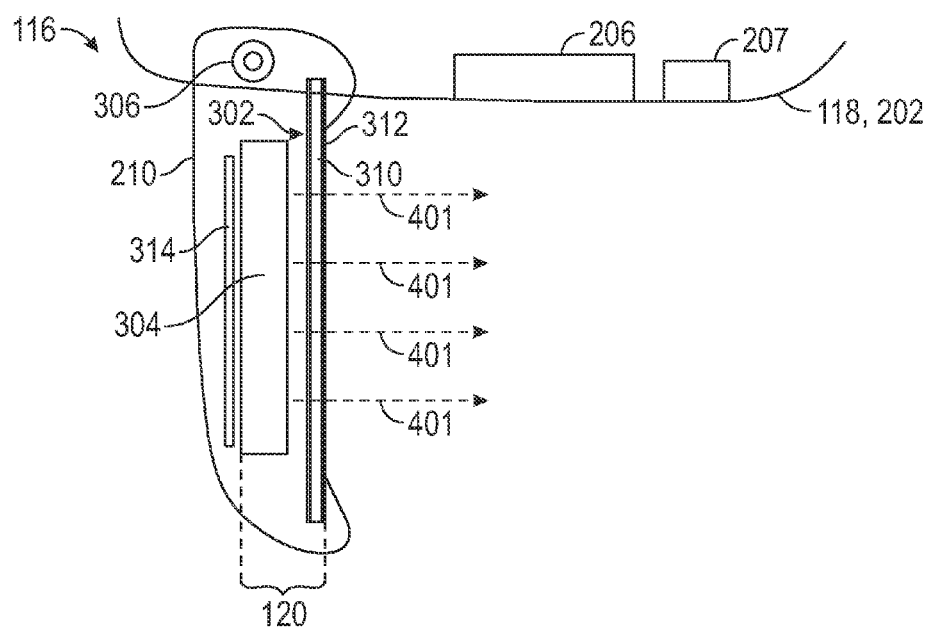
FIG. 5 is a schematic diagram of the rear vanity mirror assembly of FIGS. 1 and 2, shown with an associated light source powered off and the display screen powered on, so that an occupant in the rear portion of the vehicle behind the front seats can use the rear vanity mirror assembly as a display screen, in accordance with an exemplary embodiment.

FIG. 5 is a schematic diagram of the rear vanity mirror assembly 116 of FIGS. 1 and 2, shown with the light source 206 powered off and the display screen 304 powered on (corresponding to when the switch 207 is in the second position described above), in accordance with an exemplary embodiment. When the light source 206 is off, as in FIG. 5, the display screen 304 is turned on, and light rays 401 emitted from the display screen 304 travel through the two-way mirror 302 in a rearward direction toward the rear occupants of the vehicle 100. As such, and because the rear side of the two-way mirror 302 (i.e., the side facing toward the rear occupants) is relatively dark (as compared with the front side of the two-way mirror 302), the display 120 functions as a display screen for the rear occupants while the light source 206 is off and the display screen 304 is on. In certain embodiments, the rear vanity mirror assembly 116 may also have a third setting (for example, operated by the switch 207) in which both the display screen 304 and the light source 206 are powered off at the same time (not depicted), so that the rear vanity mirror assembly 116 can also serve as a static device depending on user preference.

Figure 6:
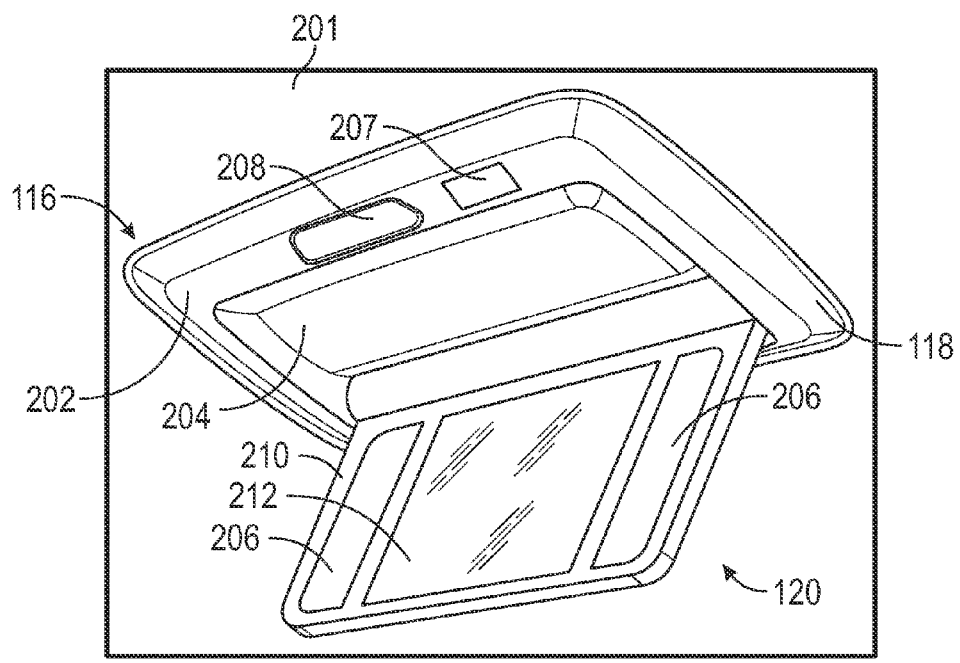
FIG. 6 is a schematic diagram of the rear vanity mirror assembly of FIG. 1, shown from a bottom view as mounted within a headliner of the vehicle of FIG. 1, in accordance with an exemplary embodiment.
Figure 7:
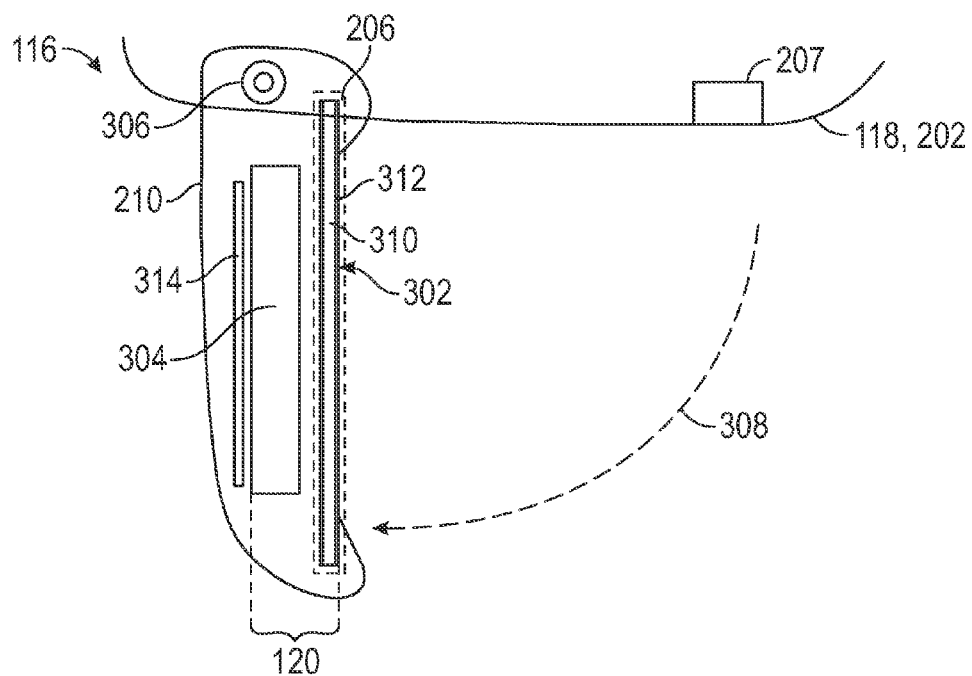
FIG. 7 is a schematic diagram of the rear vanity mirror assembly of FIGS. 1 and 2, in accordance with another exemplary embodiment.
Figure 8:
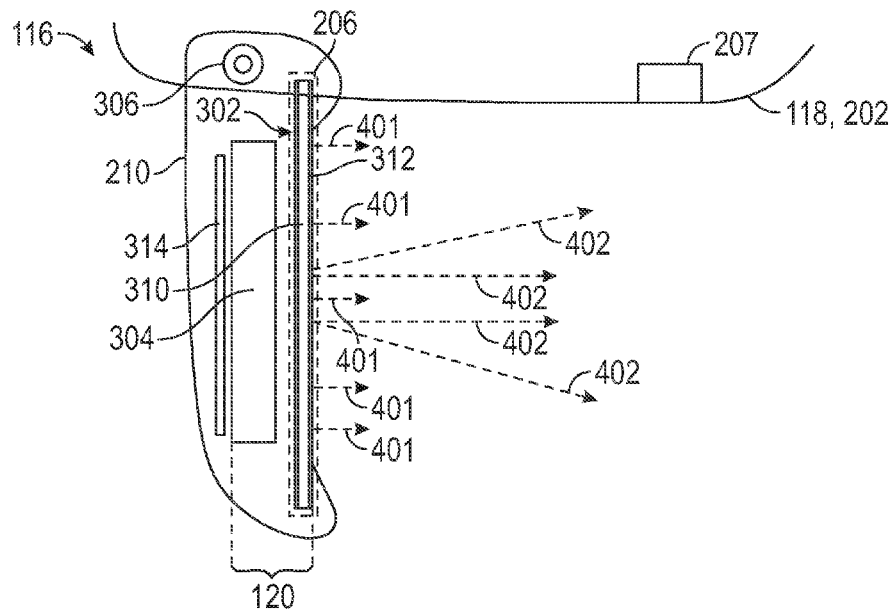
FIG. 8 is a schematic diagram of the rear vanity mirror assembly of FIGS. 1 and 6, shown with an associated light source powered on and the display screen powered off, so that an occupant in the rear portion of the vehicle behind the front seats can use the rear vanity mirror assembly as a vanity mirror, in accordance with an exemplary embodiment.
Figure 9:
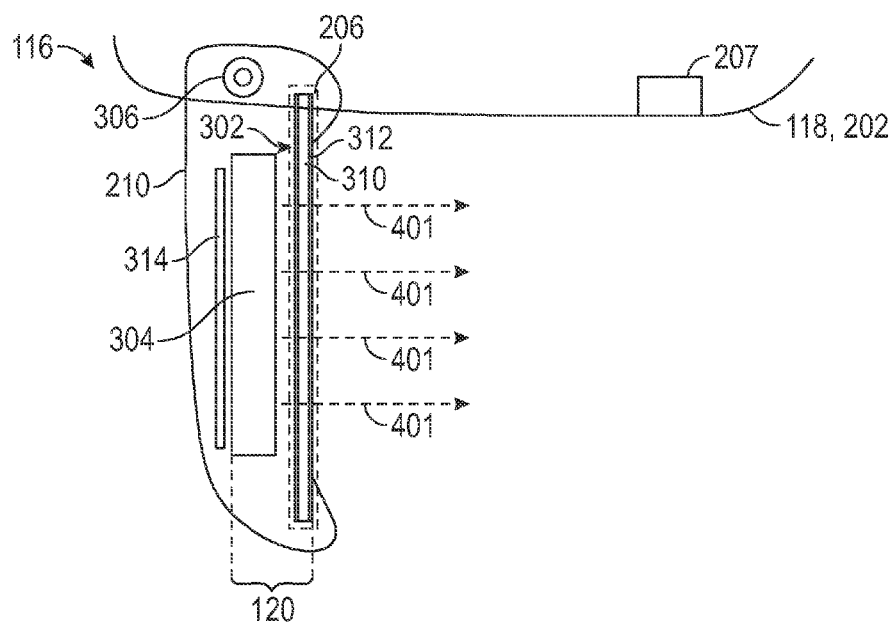
FIG. 9 is a schematic diagram of the rear vanity mirror assembly of FIGS. 1 and 6, shown with an associated light source powered off and the display screen powered on, so that an occupant in the rear portion of the vehicle behind the front seats can use the rear vanity mirror assembly as a display screen, in accordance with an exemplary embodiment.

FIGS. 6-9 depict the display 120 in accordance with a second exemplary embodiment. The embodiment is similar in structure, purpose, and function as to that described above in connection with FIGS. 2-5, except that in the second exemplary embodiment of FIG. 6-9 a light source 206 is disposed on each side of the mirror 302 rather than proximate the headliner as in FIGS. 2-5. Preferably, in the second embodiment of FIGS. 2-5, two light sources 206 are disposed within the display housing 210 on opposite sides of the viewable region 212, such as is shown in FIG. 6.

In addition, in certain embodiments, the light intensity of the screen (in any of the exemplary embodiments described above) may be controlled to a certain level depending on the given ambient light conditions (e.g., night vs. day). Specifically, this may be driven by an ambient lighting sensor (not depicted, but that could be disposed anywhere outside the vehicle) that detects a level of ambient light brightness outside the vehicle for use in controlling the light intensity of the screen as well as other lit components in a vehicle for day and nighttime conditions. In addition, in certain embodiments, the system may include a manual override so that the occupant could choose a screen intensity setting regardless of the given ambient lighting conditions. This could be accomplished, for example, via a dimmer switch, a user preferences menu in the system software, a user remote control, and/or one or more other different techniques).

Accordingly, the rear vanity mirror assembly 116 serves multiple functions for the rear occupants of the vehicle 100. Once the rear vanity mirror assembly 116 is rotated downward into its open position of FIGS. 2-5, the display 120 of the rear vanity mirror assembly 116 can be used as a vanity mirror by rear occupants when the light source 206 is turned on (as in FIG. 4). In addition, the display 120 can be used instead as a display screen (for example, as a video screen for displaying information or entertainment for the rear occupants) when the light source 206 is turned off (as in FIG. 5).

It will be appreciated that the devices, assemblies, systems, and vehicles may vary from those depicted in the Figures and described herein. For example, the vehicle 100, the rear vanity mirror assembly 116, and/or various components thereof may vary from that depicted in FIGS. 1-5 and described in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vanity mirror assembly for a vehicle, the vehicle having front seats and a rear portion behind the front seats, the vanity mirror assembly comprising:
   a light source disposed in the rear portion;
   a display screen disposed between the front seats and the light source;
   a two-way mirror disposed between the light source and the display screen; and
   a switch movable between:
      a first position, in which the light source is turned on and the display screen is turned off; and
      a second position, in which the light source is turned off and the display screen is turned on.

2. The vanity mirror assembly of claim 1, wherein the display screen comprises a video display screen.

3. The vanity mirror assembly of claim 1, wherein the display screen is disposed adjacent to the two-way mirror.

4. The vanity mirror assembly of claim 1, further comprising:
   a housing, wherein the two-way mirror and the display screen are movable together from a base of the housing.

5. The vanity mirror assembly of claim 4, wherein the housing is disposed within a headliner of the vehicle.

6. The vanity mirror assembly of claim 4, further comprising:
   a hinge disposed within the housing, wherein the two-way mirror and the display screen are configured to flip downward via the hinge.

7. The vanity mirror assembly of claim 1, wherein the switch is further configured to operate an additional setting in which the light source is turned off and the display is turned off.

8. A vanity mirror assembly for a vehicle, the vehicle having front seats and a rear portion behind the front seats, the vanity mirror assembly comprising:
   a housing;
   a mirror disposed within the housing in the rear portion of the vehicle, the mirror being partially reflective and partially transparent;
   a display screen disposed within the housing between the front seats and the mirror;
   a light source disposed within the housing; and
   a switch movable between:
      a first position, in which the light source is turned on and the display screen is turned off; and
      a second position, in which the light source is turned off and the display screen is turned on.

9. The vanity mirror assembly of claim 8, wherein the display screen is disposed adjacent to the mirror.

10. The vanity mirror assembly of claim 8, wherein the mirror and the display screen are movable together from a base of the housing.

11. The vanity mirror assembly of claim 10, wherein the housing is disposed within a headliner of the vehicle.

12. The vanity mirror assembly of claim 10, further comprising:
   a hinge disposed within the housing, wherein the mirror and the display screen are configured to flip downward via the hinge.

13. The vanity mirror assembly of claim 10,
   wherein the light source faces the mirror, such that the mirror is disposed between the light source and the display screen.

14. The vanity mirror assembly of claim 8, wherein:
   the display has a viewable region that is visible to one or more passengers in the rear portion;
   the light source is disposed on a first side of the viewable region; and
   the vanity mirror assembly further comprises a second light source that is disposed on a second side of the viewable region that is opposite the first side.

15. A vehicle comprising:
   a body;

front seats;
a rear portion behind the front seats; and
a vanity mirror assembly comprising:
  a housing;
  a two-way mirror disposed within the housing in the rear portion of the vehicle;
  a display screen disposed within the housing between the front seats and the two-way mirror and movable with the two-way mirror;
  a light source disposed within the housing; and
  a switch movable between:
    a first position, in which the light source is turned on and the display screen is turned off; and
    a second position, in which the light source is turned off and the display screen is turned on.

16. The vehicle of claim 15, wherein the display screen is disposed adjacent to the two-way mirror.

17. The vehicle of claim 15, wherein the vehicle comprises a headliner, and the housing is disposed within the headliner.

18. The vehicle of claim 15, wherein the vanity mirror assembly further comprises:

a hinge disposed within the housing, wherein the two-way mirror and the display screen are configured to flip downward from a base of the housing via the hinge.

19. The vehicle of claim 15, wherein the light source faces the two-way mirror, such that the two-way mirror is disposed between the light source and the display screen.

20. The vehicle of claim 15, wherein:

the display has a viewable region that is visible to one or more passengers in the rear portion;

the light source is disposed on a first side of the viewable region; and the vanity mirror assembly further comprises a second light source that is disposed on a second side of the viewable region that is opposite the first side.

* * * * *